United States Patent [19]

Yoda

[11] Patent Number: 5,052,720

[45] Date of Patent: Oct. 1, 1991

[54] SWIVEL JOINT FOR HIGH PRESSURE FLUID

[75] Inventor: Akira Yoda, Yokohama, Japan

[73] Assignee: Tokyo Sharyo Seizo Kabushiki Kaisha, Tokyo, Japan

[21] Appl. No.: 394,568

[22] Filed: Aug. 16, 1989

[30] Foreign Application Priority Data

Aug. 18, 1988 [JP] Japan .............................63-108375 [U]
Mar. 14, 1989 [JP] Japan ...............................1-28732[U]

[51] Int. Cl.⁵ .............................................. F16L 55/00
[52] U.S. Cl. ......................................... 285/14; 285/94; 285/98; 285/281; 285/351; 285/900
[58] Field of Search ..................... 285/94, 900, 14, 98, 285/281, 351

[56] References Cited

U.S. PATENT DOCUMENTS

| | | | |
|---|---|---|---|
| 2,676,039 | 4/1954 | Habig | 285/94 |
| 2,770,475 | 11/1956 | Rafferty | 285/94 |
| 2,985,468 | 5/1961 | Shaw et al. | 285/94 X |
| 3,694,008 | 9/1972 | Slator et al. | 285/94 |
| 4,396,212 | 8/1983 | Honke | 285/94 |
| 4,487,435 | 12/1984 | Yamatoni | 285/94 |

FOREIGN PATENT DOCUMENTS

| | | | |
|---|---|---|---|
| 3209340 | 4/1983 | Fed. Rep. of Germany | 285/94 |
| 137792 | 8/1982 | Japan . | |
| 184188 | 11/1986 | Japan . | |
| 184189 | 11/1986 | Japan . | |
| 689932 | 4/1953 | United Kingdom | 285/94 |

Primary Examiner—Dave W. Arola
Attorney, Agent, or Firm—Bauer & Schaffer

[57] ABSTRACT

A swivel joint for high pressure fluid capable of preventing the leakage of the high pressure fluid and smoothing the rotation of the rotating one of the shaft member and the receiving member, with a simple and compact structure, which can be manufactured inexpensively. The swivel joint includes a cylindrical cavity formed inside the receiving member and around the shaft member. including: a contacting end, normal to an axial direction along the axis of relative rotation of the shaft member and the receiving member, contacting with the high pressure fluid through the connecting portion connecting the fluid paths of the shaft member and the receiving member; a movable sealing member, movable in the axial direction, contacting with the high pressure fluid through the contacting end; and a hollow chamber, separated from the contacting end by the movable sealing member, confining the fat oil.

5 Claims, 8 Drawing Sheets

SWIVEL JOINT FOR HIGH PRESSURE FLUID

BACKGROUND OF THE INVENTION

1. Field of the Invention

The present invention relates to a swivel joint for high pressure fluid to be used in leading high pressure fluid from a fixed body into a rotating body.

2. Description of the Background Art

As a conventional swivel joint for high pressure fluid to be used in leading high pressure fluid from a fixed body into a rotating body, there is a type of swivel joint which utilizes lubricant in order to increase sealing effect of the high pressure fluid and at a same time smoothing the rotation of the rotating body, such as those disclosed in Japanese Patent Application Laid Open No. S57-137792, Japanese Utility Model Application Laid Open No. 61-184188, and Japanese Utility Model Application Laid Open No. 61-184189.

In such a conventional swivel joint for high pressure fluid, in order to prevent the leakage of the high pressure fluid from a passage joining a fluid path inside the fixed body and a fluid path inside the rotating body, there is provided a packing between the fixed body and the rotating body and also a lubricant having the same pressure as the high pressure fluid is supplied externally to the packing on a side opposite to that facing the passage. Thus, in this swivel joint for high pressure fluid, the leakage of the high pressure fluid is prevented as a result of balancing between the pressures exerted to the packing from opposing sides, and at a same time the rotation of the rotating body is smoothed by the lubricant.

However, in such a conventional swivel joint for high pressure fluid, it has been necessary to provide a separate means for supplying the lubricant at an appropriate pressure, which usually comprises a cylinder incorporating a piston on one side of which a part of the high pressure fluid is led and on the other side of which the lubricant to be supplied is led, so that it has been unavoidable for a number of elements involved to become too great from a standpoint of compactification as well as that of manufacturing cost.

SUMMARY OF THE INVENTION

It is therefore an object of the present invention to provide a swivel joint for high pressure fluid capable of preventing the leakage of the high pressure fluid and smoothing the rotation of the rotating body, with a simple and compact structure, which can be manufactured inexpensively.

In addition, it is another object of the present invention to provide such a swivel joint for high pressure fluid which has an extremely small amount of leakage of a fat oil to be utilized.

According to a first aspect of the present invention there is provided a swivel joint for high pressure fluid, comprising: a shaft member having a first fluid path; a receiving member, into which the shaft member is inserted such that one of the shaft member and the receiving member is relatively rotatable around an axis with respect to another one which is fixed, where the high pressure fluid flows from the another one that is fixed to the one that is relatively rotating, the receiving member having a second fluid path; a connecting portion connecting the first fluid path and the second fluid path; and a cylindrical cavity formed inside the receiving member and around the shaft member, including: a contacting end, normal to an axial direction along the axis of relative rotation of the shaft member and the receiving member, contacting with the high pressure fluid through the connecting portion; a movable sealing member, movable in the axial direction, contacting with the high pressure fluid through the contacting end; and a hollow chamber, separated from the contacting end by the movable sealing member, confining the fat oil.

According to a second aspect of the present invention there is provided a swivel joint for high pressure fluid, comprising: a shaft member having a first fluid path; a receiving member, into which the shaft member is inserted such that one of the shaft member and the receiving member is relatively rotatable around an axis with respect to another one which is fixed, where the high pressure fluid flows from the another one that is fixed to the one that is relatively rotating, the receiving member having a second fluid path; a connecting portion connecting the first fluid path and the second fluid path; a cylindrical cavity formed inside the receiving member and around the shaft member, including: a contacting end, normal to an axial direction along the axis of relative rotation of the shaft member and the receiving member, contacting with the high pressure fluid through the connecting portion; a movable sealing member, movable in the axial direction, contacting with the high pressure fluid through the contacting end; and a hollow chamber, separated from the contacting end by the movable sealing member, confining the fat oil; at least one cylindrical step cavity formed inside the receiving member and around the shaft member, one of which being located adjacent to the cylindrical cavity and all of which being located one after another along the axial direction, each one of the cylindrical step cavity including: a movable step sealing member movable in the axial direction, having a smaller diameter side contacting an adjacent cylindrical cavity or cylindrical step cavity which is closer to the connecting portion, and a larger diameter side opposite to the smaller diameter side; and an additional hollow chamber separated from the smaller diameter side of the movable step sealing member and contacting with the large diameter side of the movable step sealing member, confining the fat oil.

In the first aspect mentioned above, when the high pressure fluid is supplied from an open end of the first fluid path of the shaft member, the high pressure fluid is lead through the first fluid path of the shaft member to the connecting portion inside the receiving member. At this point, the pressure of the high pressure fluid is also exerted on the movable sealing member which is also contacting with the high pressure fluid through the contacting end and the connecting portion, so that the movable sealing member is pushed and moved away from the connecting portion. Consequently, the hollow chamber located at an opposite side of the movable sealing member from the connecting portion is compressed and the pressure of the fat oil confined in the hollow chamber is increased until the pressure of the fat oil and that of the high pressure fluid are balanced at which point the movable sealing member stops. Thus, the balancing of the pressure of the high pressure fluid and that of the fat oil by means of which the leakage of the high pressure fluid is prevented can be achieved automatically, so that the leakage of the high pressure fluid can be prevented almost completely.

Here, since the fat oil is given as high a pressure as the high pressure fluid, a very small amount of leakage of the fat oil does occur, so that the amount of the fat oil in the hollow chamber will decrease very gradually. However, this leakage of the fat oil only causes the movable sealing member to move a little farther away from the connecting portion, so that the complete prevention of the leakage of the high pressure fluid can be maintained. The fat oil will eventually leak out completely had the swivel joint been used for excessively extended period of time, so it is necessary to refill the fat oil at appropriate regular intervals in order to avoid this from happening.

On the other hand, the fat oil functions as a lubricant, by means of which the rotation of the rotating one of the shaft member and the receiving member can be made smooth.

Furthermore, this swivel joint for high pressure fluid has a simple and compact structure which can be manufactured inexpensively, in comparison with the conventional swivel joint for high pressure fluid, because it is not necessary to provide an additional separate means for supplying the lubricant at an appropriate pressure.

In the second aspect mentioned above, the similar advantages described for the first aspect are also obtainable. Namely, the balancing of the pressure of the high pressure fluid and that of the fat oil by means of which the leakage of the high pressure fluid is prevented can be achieved automatically, so that the leakage of the high pressure fluid can be prevented almost completely, and the fat oil functions as a lubricant, by means of which the rotation of the rotating one of the shaft member and the receiving member can be made smooth.

Furthermore, according to the second aspect, because of the additional feature of at least one cylindrical step cavity formed inside the receiving member and around the shaft member, one of which being located adjacent to the cylindrical cavity and all of which being located one after another along the axial direction, each one of the cylindrical step cavity including: a movable step sealing member movable in the axial direction, having a smaller diameter side contacting an adjacent cylindrical cavity or cylindrical step cavity which is closer to the connecting portion, and a larger diameter side opposite to the smaller diameter side; and an additional hollow chamber separated from the smaller diameter side of the movable step sealing member and contacting with the larger diameter side of the movable step sealing member, confining the fat oil, the pressures of the fat oils confined in the hollow chamber and the additional hollow chamber are smaller than that of the high pressure fluid, so that the amount of leakage of the fat oils can be made smaller than that in the first aspect mentioned above, and so consequently the refilling of the fat oils will be required less frequently, although the structure in the second aspect becomes somewhat more complicated than in the first aspect mentioned above, because of this additional feature.

Other features and advantages of the present invention will become apparent from the following description taken in conjunction with the accompanying drawings.

DETAILED DESCRIPTION OF THE PREFERRED EMBODIMENTS

Figure 1:
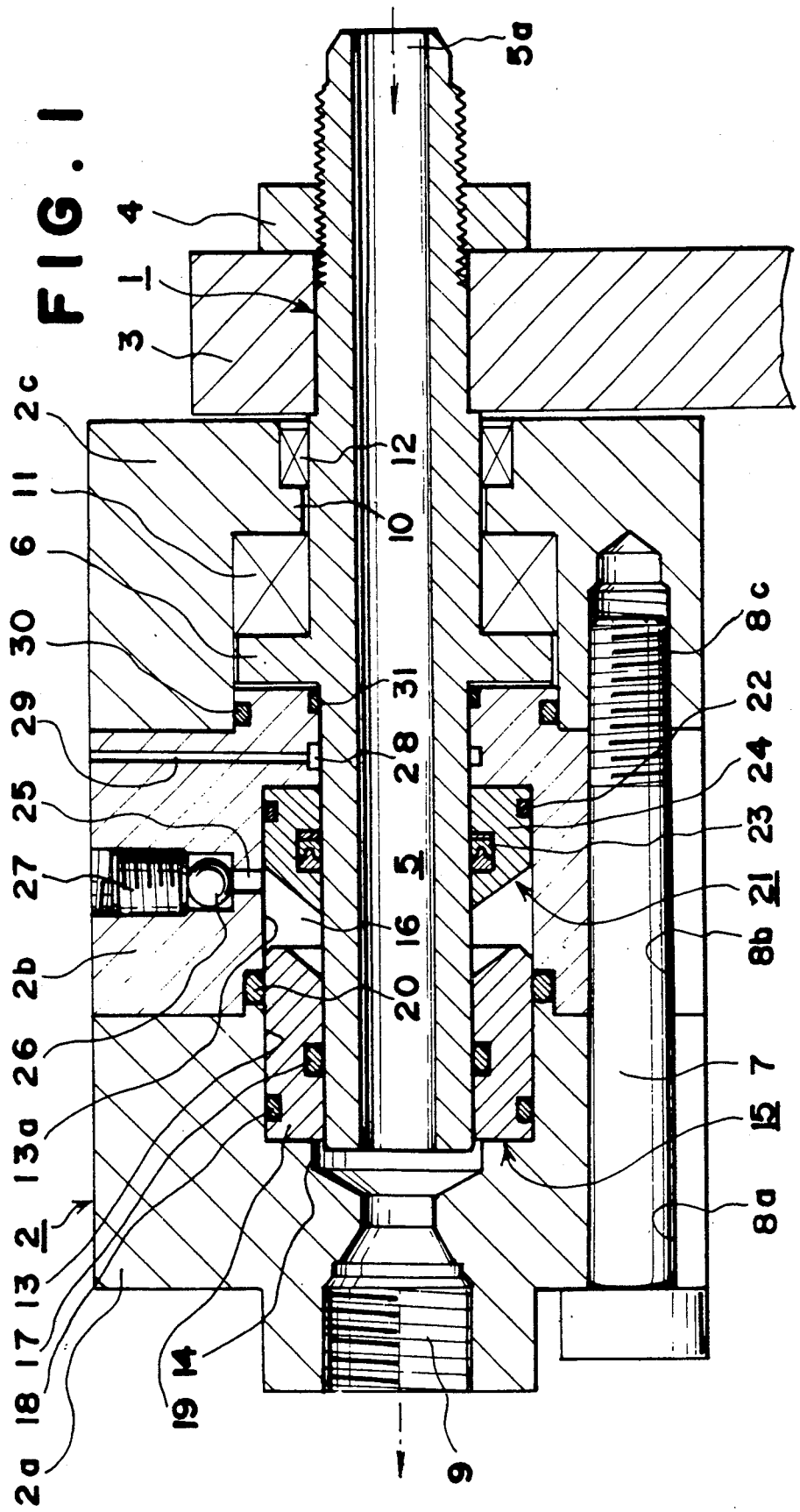
FIG. 1 is a vertical cross sectional view of a first embodiment of a swivel joint for high pressure fluid according to the present invention.

Referring now to FIG. 1, there is shown a first embodiment of a swivel joint for high pressure fluid according to the present invention.

In this first embodiment, the swivel joint for high pressure fluid generally comprises a shaft member 1 with a threaded rear end and an unthreaded front end, and a receiving member 2 into which the shaft member 1 is thrusted from the front end side. The shaft member 1 is fixed to a supporting member 3 by an engagement of the threaded rear end with a nut 4. On the other hand, as shown in FIG. 1, the unthreaded front end of the shaft member 1 is located within the receiving member 2 such that in effect the receiving member 2 is rotatably mounted on the shaft member 1.

The shaft member 1 has a straight fluid path 5 between two ends, with the threaded rear end side opening 5a of which being freely connectable to an external high pressure fluid supplying hose. The shaft member 1 also has a flange portion 6 to be located inside the receiving member 2, for preventing an accidental detachment of the shaft member 1 and the receiving member 2.

The receiving member 2 is divided into a front portion 2a, a middle portion 2b, and a rear portion 2c, which are connected together by a connecting bolt 7 with a threaded end. To receive the connecting bolt 7, the front portion 2a and the middle portion 2b have pierced slots 8a and 8b, respectively, while the rear portion 2c has a threaded slot 8c to be engaged with the threaded end of the connecting bolt 7.

The front portion 2a has a fluid path 9 to be connected and aligned with the fluid path 5 of the shaft member 1. This fluid path 9 has its front end threaded so that a joint of a hose for receiving the high pressure fluid can be attached. The connection between the fluid path 5 of the shaft member 1 and the fluid path 9 of the receiving member 2 is furnished by a connecting portion 14 provided at a rear end of the fluid path 9 in the front portion 2a.

On the other hand, inside the front portion 2a and the middle portion 2b, there is formed a cylindrical cavity 13 surrounding the shaft member 1 in a vicinity of its front end, and the connecting portion 14 has a diameter larger than that of the shaft member 1 such that a front end of this cylindrical cavity 13 is also connected with the fluid path 9 through the connecting portion 14. This cylindrical cavity 13 may be incorporated inside the shaft member 1 of much larger diameter than that shown in FIG. 1, instead of being formed between the shaft member 1 and the receiving member 2 as shown in FIG. 1.

In the cylindrical cavity 13, there is a movable sealing member 15 movable along a direction of an axis of the rotation of the receiving member 2, by means of which the front end of the cylindrical cavity 13 connected with the connecting portion 14 is separated and sealed off from a hollow chamber 13a formed inside the cylindrical cavity 13 at an opposite end of the movable sealing member 15 in which a fat oil 16 is to be confined.

This movable sealing member 15 is comprised of a bushing 19 equipped with O-rings 17 and 18 at boundaries with the receiving member 2 and the shaft member 1, respectively. This bushing 19 is preferably made of a material having a small coefficient of friction and being highly durable.

In addition, in the cylindrical cavity 13, there is also a fixed sealing member 21 at a rear end of the cylindrical cavity 13 for preventing leakage of the fat oil 16 from the rear end of the cylindrical cavity 13. This fixed sealing member 21 is comprised of a bushing 24 equipped with an O-ring 22 and a packing 23 at boundaries with the receiving member 2 and the shaft member 1, respectively.

The middle portion 2b further has a supply opening 25 connecting the hollow chamber 13a with outside of the receiving member 2, from which the fat oil 16 will be filled. This supply opening 25 is equipped with a steal ball 26 for opening and closing of the supply opening 25, and a stopping screw 27 for pressing down and keeping the steal ball at a closed position after the fat oil 16 has been filled.

Thus, when the fat oil 16 is filled from the supply opening 25 and the supply opening 25 is closed by means of the steal ball 26 and the stopping screw 27, the fat oil 16 can be confined inside the hollow chamber 13a sealed by the movable and fixed sealing members 15 and 21. The movable sealing member 15 need not be placed at the front end of the cylindrical cavity 13 as shown in FIG. 1 from the beginning, as it will automatically move into that position when the fat oil 16 is filled.

The middle portion 2b also has a ring shaped draining groove 28 surrounding the shaft member 1 and a draining path 29 connecting this draining groove 28 with outside of the receiving member 2, by means of which a damaging due to the accidentally leaked high pressure fluid or fat oil can be avoided.

The rear portion 2c has an inner flange portion 10, and between this inner flange portion 10 and the flange portion 6 of the shaft member 1 there is a thrust bearing 11 by means of which an accidental detachment of the shaft member 1 and the receiving member 2 can be prevented without hampering the rotation of the receiving member 2.

The receiving member 2 is also provided with O-rings 20, 30, and 31 at boundaries between a rear end of the front portion 2a and a front end of the middle portion 2b, a rear end of the middle portion 2b and a front end of the rear portion 2c, and a rear end of the middle portion 2b and the flange portion 6 of the shaft member 1, respectively, for sealing these boundaries, and a dust sealing member 12 at a rear end of the rear portion 2c for protecting structure inside of the receiving member 2 from contamination by dust.

This first embodiment of a swivel joint for high pressure fluid operates as follows.

When the high pressure fluid is supplied from the rear end side opening 5a of the shaft member 1, the high pressure fluid is lead through the fluid path 5 of the shaft member 1 to the connecting portion 14 in the front portion 2a of the receiving member 2. At this point, the pressure of the high pressure fluid is also exerted on the movable sealing member 15 which is also connected with the connecting portion 14, so that the movable sealing member 15 is pushed and moved away from the connecting portion 14. Consequently, the hollow chamber 13a located at an opposite side of the movable sealing member 15 from the connecting portion 14 is compressed and the pressure of the fat oil confined in the hollow chamber 13a is increased until the pressure of the fat oil and that of the high pressure fluid are balanced at which point the movable sealing member 15 stops.

Thus, in this first embodiment, the balancing of the pressure of the high pressure fluid and that of the fat oil 16 by means of which the leakage of the high pressure fluid is prevented can be achieved automatically, so that the leakage of the high pressure fluid can be prevented almost completely.

Now, since the fat oil 16 is given as high a pressure as the high pressure fluid, a very small amount of leakage of the fat oil 16 does occur in this first embodiment, so that the amount of the fat oil 16 in the hollow chamber 13a will decrease very gradually. However, this leakage of the fat oil 16 only causes the movable sealing member 15 to move a little farther away from the connecting portion 14, so that the complete prevention of the leakage of the high pressure fluid can be maintained. Needless to mention, the fat oil 16 will eventually leak out completely had the swivel joint been used for excessively extended period of time, so it is necessary to refill the fat oil 16 at appropriate regular intervals in order to avoid this from happening.

On the other hand, the fat oil 16 functions as a lubricant in this first embodiment, by means of which the rotation of the receiving member 2 can be made smooth.

Furthermore, in this first embodiment, the swivel joint for high pressure fluid has a simple and compact structure which can be manufactured inexpensively, in comparison with the conventional swivel joint for high pressure fluid, because it is not necessary in this embodiment to provide an additional separate means for supplying the lubricant at an appropriate pressure.

Figure 2:
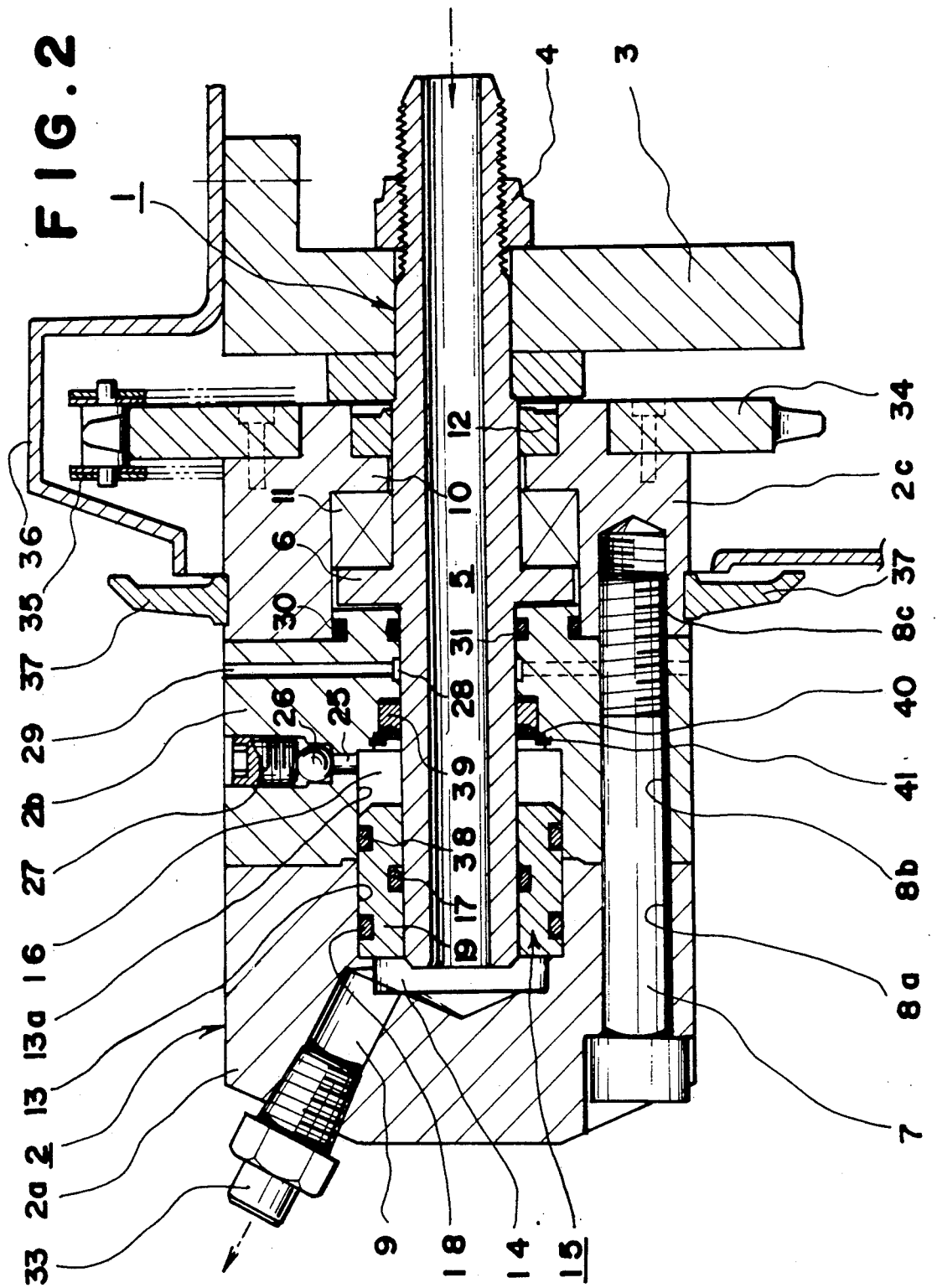
FIG. 2 is a vertical cross sectional view of one example of a rotational high pressure fluid injector utilizing the first embodiment of FIG. 1.
Figure 3:
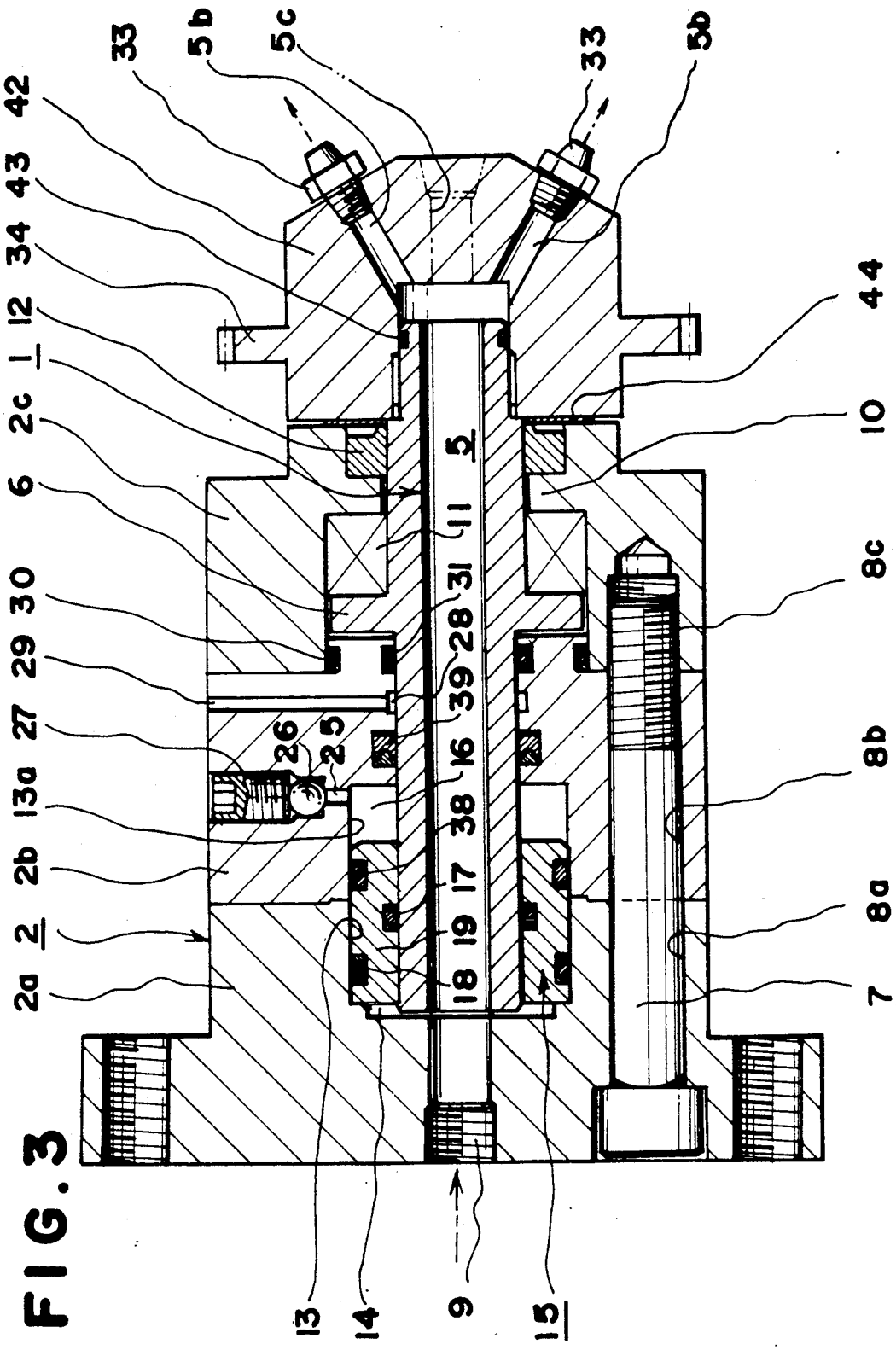
FIG. 3 is a vertical cross sectional view of another example of a rotational high pressure fluid injector utilizing the first embodiment of FIG. 1.
Figure 4:
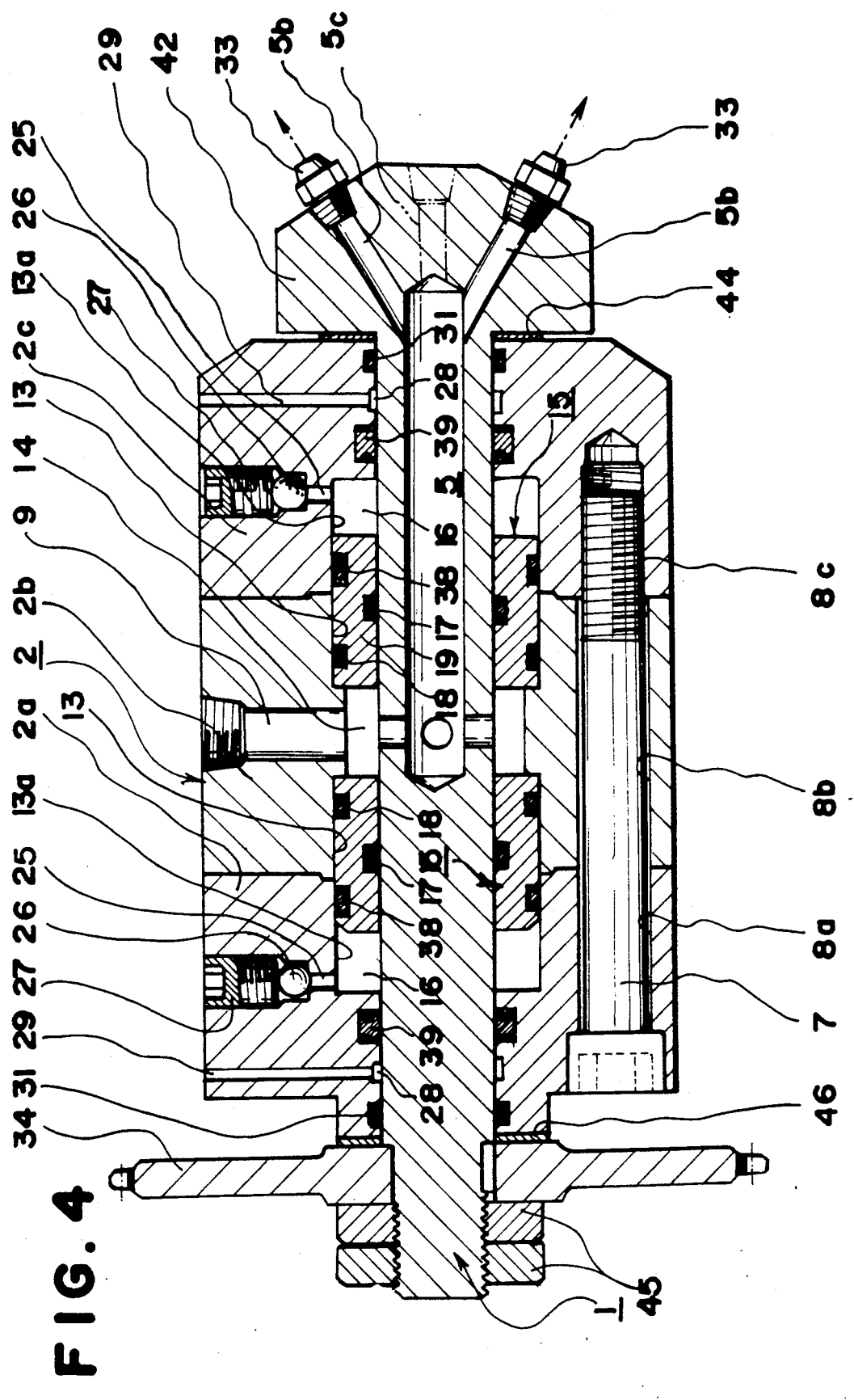
FIG. 4 is a vertical cross sectional view of still another example of a rotational high pressure fluid injector utilizing the first embodiment of FIG. 1.

Referring now to FIGS. 2 to 4, few examples of a rotational high pressure fluid injector utilizing the first embodiment of the swivel joint for high pressure fluid will be described, in which the explanations of those parts and their functions already explained above will not be repeated and the same reference numerals are given in the figures for such parts.

FIG. 2 shows one example of a rotational high pressure fluid injector in which the first embodiment of a swivel joint for high pressure fluid is utilized almost as it has been described above, except that the O-ring 20 in FIG. 1 is replaced by an O-ring 38 incorporated in the bushing 19, and that the fixed sealing member 21 in FIG. 1 is replaced by a packing 39 provided at the rear end of the hollow chamber 13a. There is also a collar 40 and a stopping ring 41 associated with the packing 39 for preventing the packing 39 from moving. It is obvious that these replacements does not give a substantial difference between this swivel joint for high pressure fluid and that of the first embodiment above.

In this rotational high pressure fluid injector of FIG. 2, the fluid path 9 connects the fluid path 5 of the shaft member 1 with an injection nozzle 33 which is pointing radially outward. Though not shown explicitly in FIG. 2, there are a plurality of additional injection nozzles similar to the injection nozzle 33 which are arranged at the front end of the receiving member 2 in a symmetrical manner.

Also, in this rotational high pressure fluid injector of FIG. 2, there is a sprocket 34 connected with a driving axis of a motor (not shown) by means of a roller chain 35, such that the receiving member 2 can be driven into the rotational motion by activating this motor. These sprocket 34 and the roller chain 35 are housed inside a hood 36 fixed to the supporting member 3, and a protector 36 preventing the intrusion of water and sludge through the clearance between the receiving member 2 and the hood 35.

With this rotational high pressure fluid injector, the rotating and radially outward pointing high pressure fluid can be injected from the injection nozzle 33, which can be useful for chipping and removing asphalt or concrete, or for washing trains or walls of a building.

FIG. 3 shows another example of a rotational high pressure fluid injector utilizing the first embodiment of the swivel joint for high pressure fluid.

In this rotational high pressure fluid injector of FIG. 3, the roles of the shaft member 1 and the receiving member 2 is reversed. Namely, the receiving member 2 is fixed to a supporting body not shown, while the shaft member 1 is held rotatable with respect to this fixed receiving member 2, and the high pressure fluid is to flow from the fluid path 9 of the receiving member 2 to the fluid path 5 of the shaft member 1.

Furthermore, in this rotational high pressure fluid injector of FIG. 3, there is a head member 42 attached to the shaft member 1 at the rear end, on which injection nozzles 33 which are connected with the fluid path 5 of the shaft member 1 by fluid paths 5b are mounted and a sprocket 34 is provided. In FIG. 3, there are also an O-ring 43 at a boundary between the shaft member 1 and the head member 42, and a flat bearing 44 between the receiving member 2 and the head member 42.

This rotational high pressure fluid injector can easily be turned into an ordinary type swivel joint for high pressure fluid by replacing the injection nozzles 33, fluid paths 5b, and sprocket 34 by a straight fluid path 5c indicated in FIG. 3 by double dotted chain lines.

FIG. 4 shows still another example of a rotational high pressure fluid injector utilizing the first embodiment of the swivel joint for high pressure fluid.

In this rotational high pressure fluid injector of FIG. 4, the receiving member 2 is fixed and the shaft member 1 is to rotate with respect to the receiving member 2, as in the previous example of FIG. 3. However, in this rotational high pressure fluid injector of FIG. 4, the head member 42 is continuously formed with the shaft member 1, which completely pierce through the receiving member 2. In conjunction with this feature, the fluid path 9 of the receiving member 2 is provided on a side of the receiving member 2 and the fluid path 5 of the shaft member 1 has crossed openings at its front end, which are connected with each other through the ring shaped connecting portion 14, and two of the pressure balancing mechanism comprising the cylindrical cavity 13 and the movable sealing member 15 are provided on both sides of the connecting portion 14 symmetrically. Furthermore, the sprocket 34 is connected at the front end of the shaft member 1 by means of nuts 45, and there is a flat bearing 46 between the sprocket 34 and the receiving member 2.

This rotational high pressure fluid injector also can easily be turned into an ordinary type swivel joint for high pressure fluid in a manner similar to that described above for the previous example of FIG. 3.

It is to be noted that many other applications of the swivel joint for high pressure fluid of FIG. 1 other than those for the rotational high pressure fluid injector just described are also possible.

Figure 5:
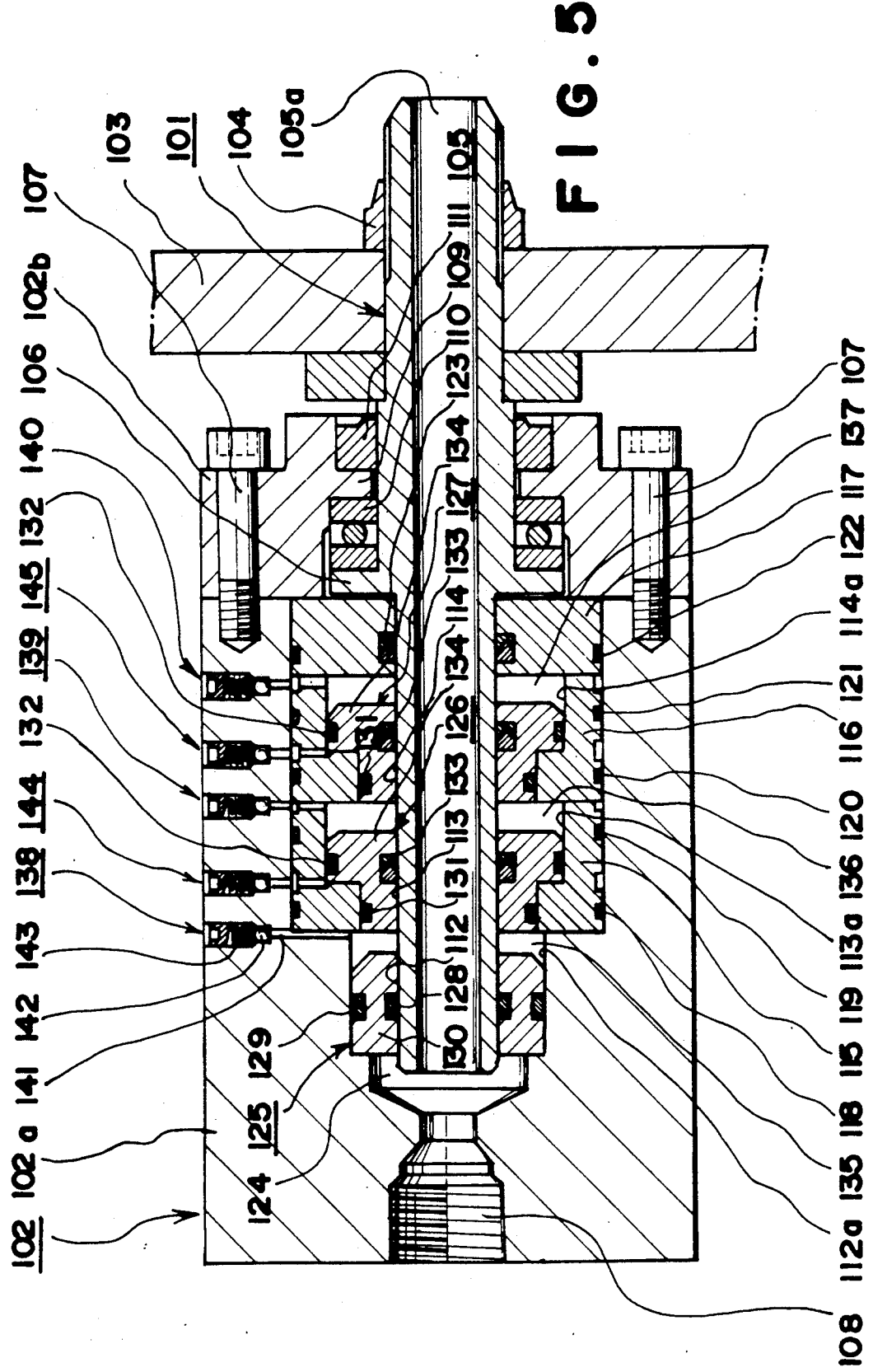
FIG. 5 is a vertical cross sectional view of a second embodiment of a swivel joint for high pressure fluid according to the present invention.

Referring now to FIG. 5, there is shown a second embodiment of a swivel joint for high pressure fluid according to the present invention.

In this second embodiment, the swivel joint for high pressure fluid generally comprises a shaft member 101 with a threaded rear end and an unthreaded front end, and a receiving member 102 into which the shaft member 101 is thrusted from the front end side. The shaft member 101 is fixed to a supporting member 103 by an engagement of the threaded rear end with a nut 104. On the other hand, as shown in FIG. 5, another unthreaded end of the shaft member 101 is located within the receiving member 102 such that in effect the receiving member 102 is rotatably mounted on the shaft member 101.

The shaft member 101 has a straight fluid path 105 between two ends, with the threaded rear end side opening 105a of which being freely connectable to an external high pressure fluid supplying hose. The shaft member 101 also has a flange portion 106 to be located inside the receiving member 102, for preventing an accidental detachment of the shaft member 101 and the receiving member 102.

The receiving member 102 is divided into a main portion 102a, and an end covering portion 102b, which are connected together by a connecting bolt 107 with a threaded end. To receive the connecting bolt 107, the end covering portion 102b has a pierced slot, while the main portion 102a has a threaded slot to be engaged with the threaded end of the connecting bolt 107.

The main portion 102a has a fluid path 108 to be connected and aligned with the fluid path 105 of the shaft member 101. This fluid path 108 has its front end threaded so that a joint of a hose for receiving the high pressure fluid can be attached. The connection between the fluid path 105 of the shaft member 101 and the fluid path 108 of the receiving member 102 is furnished by a connecting portion 124 provided at a rear end of the fluid path 108 in the main portion 102a.

On the other hand, inside the main portion 102a, there is formed a cylindrical cavity 112 surrounding the shaft member 101 in a vicinity of its front end, and the connecting portion 124 has a diameter larger than that of the shaft member 101 such that a front end of this cylindrical cavity 112 is also connected with the fluid path 108 through the connecting portion 124. In addition, there are no less than one (two in FIG. 5) cylindrical step cavities 113 and 114, each of which has a smaller diameter on a front end side and a larger diameter on a rear end side, which are arranged one after another along a direction of rotation of the receiving member 102 behind the cylindrical cavity 112. The number of the cylindrical step cavities can suitably be altered to other numbers such as one or three. In FIG. 5, these cylindrical step cavities 113 and 114 are formed by providing spacers 115, 116, and 117 of appropriate shapes inside the receiving member 102, although these spacers 115, 116, and 117 may be formed continuously with the receiving member 102. The spacer 115 incorporates O-rings 118 and 119 at a boundary between the receiving member 102 and itself, the spacer 116 incorporates O-rings 120 and 121 at a boundary between the receiving member 102 and itself, and the spacer 117 incorporates an O-rings 122 and a packing 123 at boundaries between the receiving member 102 and itself, and the shaft member 101 and itself, respectively.

In the cylindrical cavity 112, there is a movable sealing member 125 movable along a direction of an axis of the rotation of the receiving member 102, by means of which the front end of the cylindrical cavity 112 connected with the connecting portion 124 is separated and sealed off from a hollow chamber 112a formed inside the cylindrical cavity 112 at an opposite end of the movable sealing member 125, while in the cylindrical step cavities 113 and 114, there are movable step sealing members 126 and 127, respectively, each of which is movable along a direction of an axis of the rotation of the receiving member 102, by means of which the front ends of the cylindrical step cavities 113 and 114 are separated and sealed off from hollow chambers 113a and 114a formed inside the cylindrical step cavities 113 and 114 at opposite ends of the movable step sealing members 126 and 127, respectively.

This movable sealing member 125 is comprised of a bushing 130 equipped with O-rings 128 and 129 at boundaries with the receiving member 102 and the shaft member 101, respectively, while each of the movable step sealing members 126 and 127 is comprised of a bushing 134 equipped with O-rings 131 and 132 at boundaries with the spacers 115 or 116 as well as a packing 133 at a boundary with the shaft member 101. Each of these bushings 130 and 134 are preferably made of a material having a small coefficient of friction and being highly durable.

In these hollow chambers 112a, 113a, and 114a, fat oils 135, 136, and 137 are to be confined.

The main portion 102a further incorporates means 138, 139, and 140 for filling the fat oils 135, 136, and 137, respectively, each of which is comprised of a supply opening 141 connecting the hollow chambers 112a, 113a, or 114a with outside of the receiving member 102, from which the fat oils 135, 136, or 137 will be filled. This supply opening 141 is equipped with a steal ball 142 for opening and closing of the supply opening 141, and a stopping screw 143 for pressing down and keeping the steal ball 142 at a closed position after the fat oils 135, 136, or 137 has been filled. In FIG. 5, there are also breathing means 144 and 145 provided for the sake of ease in moving the movable step sealing members 126 and 127 in assembling the receiving member 102, each of which has a substantially the same structure as any of the filling means 138, 139 and 140.

Thus, when the fat oils 135, 136, and 137 are filled from the respective supply opening 141 and the supply opening 141 is closed by means of the steal ball 142 and the stopping screw 143, the fat oils 135, 136, and 137 can be confined inside the hollow chambers 112a, 113a, and 114a, respectively, sealed by the movable sealing member 125 and the movable step sealing members 126 and 127. The movable sealing member 125 and the movable step sealing members 126 and 127 need not be placed at the front end of the cylindrical cavity 112 and the cylindrical step cavities 113a and 114a, respectively, as shown in FIG. 5 from the beginning, as they will automatically move into these positions when the fat oils 135, 136, and 137 are filled.

The end covering portion 102b has an inner flange portion 109, and between this inner flange portion 109 and the flange portion 106 of the shaft member 101 there is a thrust bearing 110 by means of which an accidental detachment of the shaft member 101 and the receiving member 102 can be prevented without hampering the rotation of the receiving member 102.

The receiving member 102 is also provided with a dust sealing member 111 at a rear end of the end covering portion 102b for protecting structure inside of the receiving member 102 from contamination by dust.

This second embodiment of a swivel joint for high pressure fluid operates as follows.

When the high pressure fluid is supplied from the rear end side opening 105a of the shaft member 101, the high pressure fluid is lead through the fluid path 105 of the shaft member 101 to the connecting portion 124 in the main portion 102a of the receiving member 102. At this point, the pressure of the high pressure fluid is also exerted on the movable sealing member 125 which is also connected with the connecting portion 124, so that the movable sealing member 125 is pushed and moved away from the connecting portion 124, and subsequently the movable step sealing members 126 and 127 are also pushed and moved away from the connecting portion 124. Consequently, the hollow chambers 112a, 113a and 114a located at opposite sides of the movable sealing member 125 and the movable step sealing members 126 and 127 from the connecting portion 124, respectively, are compressed and the pressures of the fat oils 135, 136, and 137 confined in the hollow chambers 112a, 113a and 114a, respectively, are increased until the combined pressures of the fat oils 135, 136, and 137, and that of the high pressure fluid are balanced at which point the movable sealing member 125 and the movable step sealing m,embers 126 and 127 all come to stop. Here, because of the presence of the fat oils 136 and 137 in addition to the fat oil 135 and also because the fact that the cylindrical step cavities 113a and 114a confining the fat oils 136 and 137 have the smaller diameter on their front end sides than on their rear end sides, the pressures of the fat oils 135, 136, and 137 are smaller than that of the high pressure fluid.

Thus, in this second embodiment, the balancing of the pressure of the high pressure fluid and that of the fat oils 135, 136, and 137 combined, by means of which the leakage of the high pressure fluid is prevented, can be achieved automatically, so that the leakage of the high pressure fluid can be prevented almost completely, just as in the first embodiment described above.

Now, the fat oils 135, 136, and 137 are still given a fairly high pressure, so that a very small amount of leakage of the fat oil 135, 136, and 137 do occur in this second embodiment as well, so that the amount of the fat oils 135, 136 and 137 in the hollow chambers 112a, 113a and 114a will decrease very gradually. However, this leakage of the fat oils 135, 136, and 137 only causes the movable sealing member 125 and the movable step sealing members 126 and 127 to move a little farther away from the connecting portion 124, so that the complete prevention of the leakage of the high pressure fluid can be maintained. Needless to mention, the fat oils 135, 136, 137 will eventually leak out completely had the swivel joint been used for excessively extended period of time, so it is necessary to refill the fat oils 135, 136, and 137 at appropriate regular intervals in order to avoid this from happening. In this regard, it is to be noted that in this second embodiment, since the pressures exerted on the fat oils 135, 136, and 137 are smaller than that on the fat oil 16 in the first embodiment above, the amount of leakage of the fat oils 135, 136, and 137 are also smaller than that of the fat oil 16 in the first embodiment above, so that the refilling of the fat oils 135, 136, and 137 will be required less frequently compared with that of the fat oil 16 in the first embodiment above.

On the other hand, the fat oils 135, 136, and 137 function as lubricants in this second embodiment, by means of which the rotation of the receiving member 102 can be made smooth.

Furthermore, in this second embodiment, the swivel joint for high pressure fluid has a simple and compact structure which can be manufactured inexpensively, in comparison with the conventional swivel joint for high pressure fluid, although this second embodiment is somewhat more complicated than the first embodiment above, because it is not necessary in this embodiment to provide an additional separate means for supplying the lubricant at an appropriate pressure.

Figure 6:
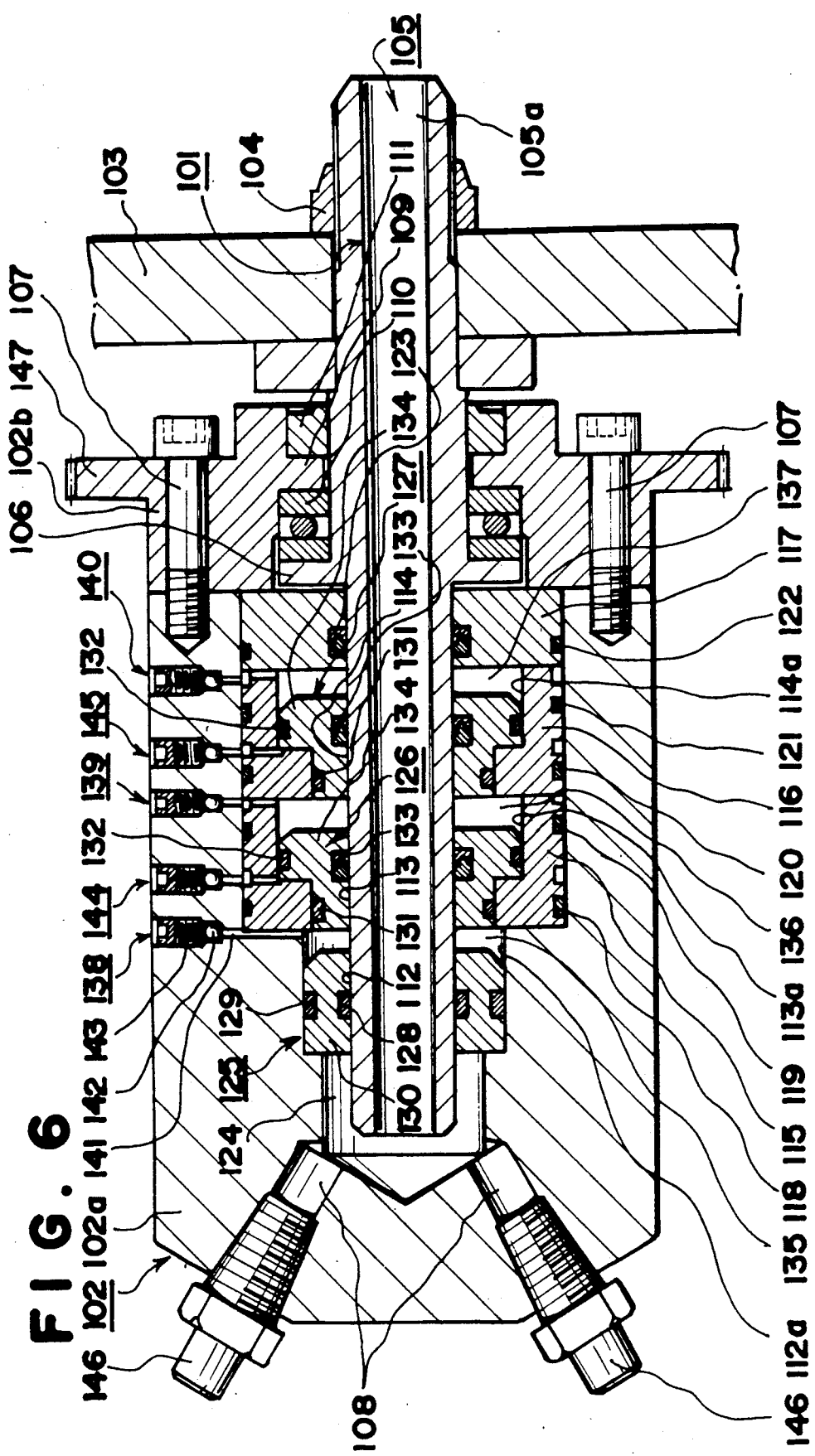
FIG. 6 is a vertical cross sectional view of one example of a rotational high pressure fluid injector utilizing the second embodiment of FIG. 5.
Figure 7:
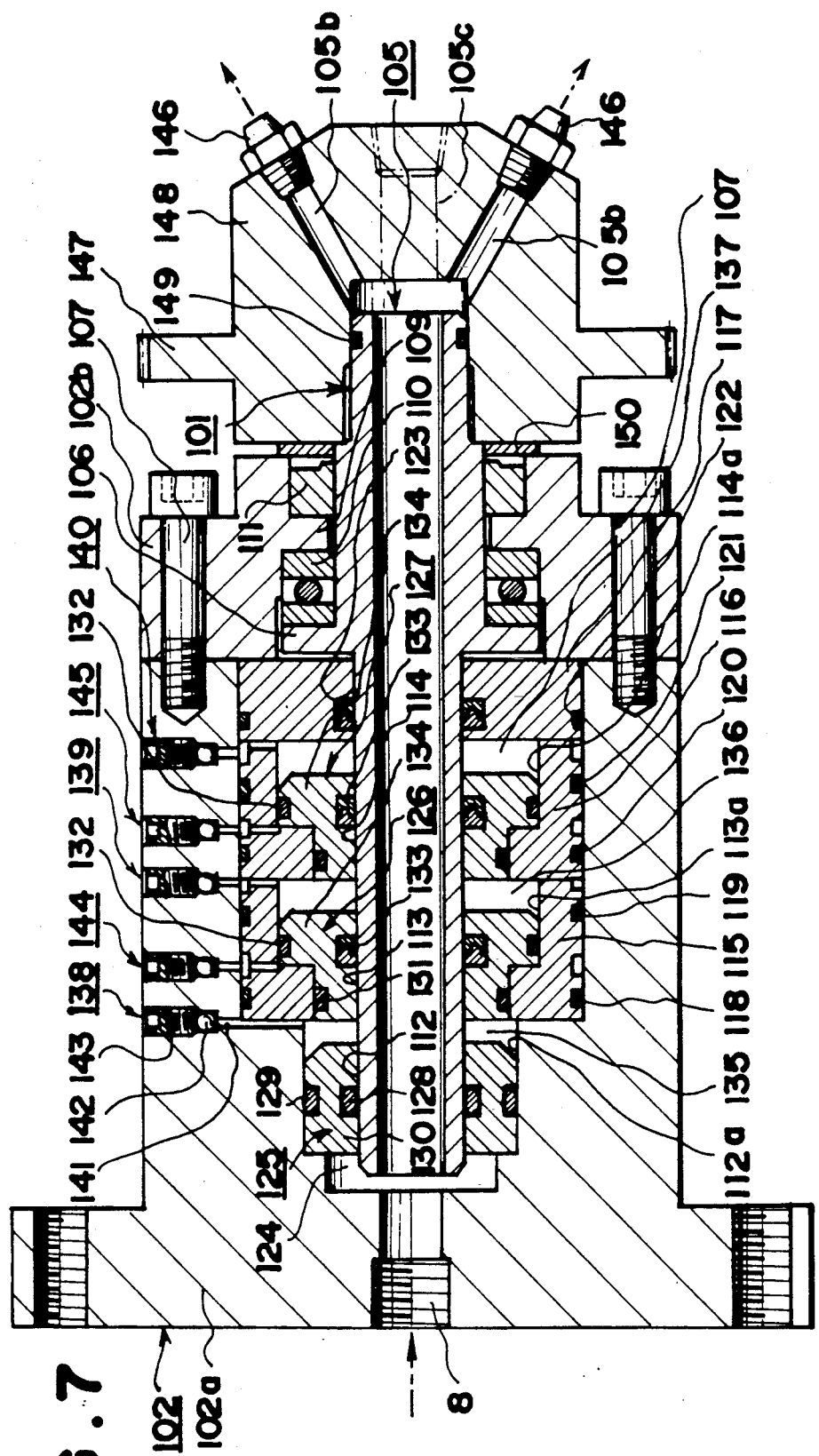
FIG. 7 is a vertical cross sectional view of another example of a rotational high pressure fluid injector utilizing the second embodiment of FIG. 5.
Figure 8:
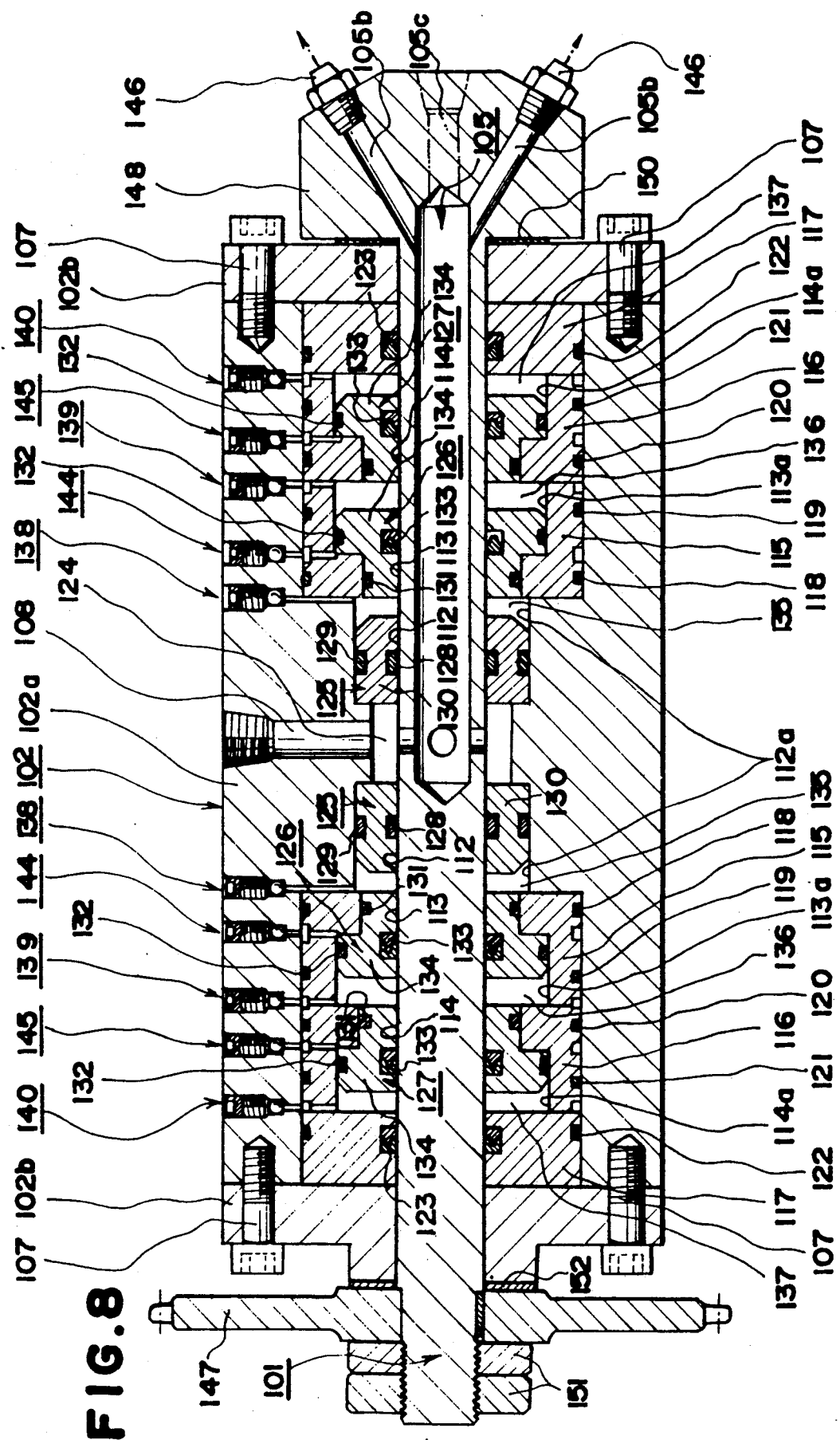
FIG. 8 is a vertical cross sectional view of still another example of a rotational high pressure fluid injector utilizing the second embodiment of FIG. 5.

Referring now to FIGS. 6 to 8, few examples of a rotational high pressure fluid injector utilizing the second embodiment of the swivel joint for high pressure fluid will be described, in which the explanations of those parts and their functions already explained above will not be repeated and the same reference numerals are given in the figures for such parts.

FIG. 6 shows one example of a rotational high pressure fluid injector in which the second embodiment of a swivel joint for high pressure fluid is utilized as it has been described above.

In this rotational high pressure fluid injector of FIG. 6, the fluid path 108 connects the fluid path 105 of the shaft member 101 with injection nozzles 146 which are pointing radially outward and are arranged at the front end of the receiving member 102 in a symmetrical manner.

Also, in this rotational high pressure fluid injector of FIG. 6, there is a sprocket 147 connected with a driving axis of a motor (not shown) by means of a roller chain (not shown), such that the receiving member 102 can be driven into the rotational motion by activating this motor.

With this rotational high pressure fluid injector, the rotating and radially outward pointing high pressure fluid can be injected from the injection nozzles 146, which can be useful for chipping and removing asphalt or concrete, or for washing trains or walls of a building.

FIG. 7 shows another example of a rotational high pressure fluid injector utilizing the second embodiment of the swivel joint for high pressure fluid.

In this rotational high pressure fluid injector of FIG. 7, the roles of the shaft member 101 and the receiving member 102 is reversed. Namely, the receiving member 102 is fixed to a supporting body not shown, while the shaft member 101 is held rotatable with respect to this fixed receiving member 102, and the high pressure fluid is to flow from the fluid path 108 of the receiving member 102 to the fluid path 105 of the shaft member 101.

Furthermore, in this rotational high pressure fluid injector of FIG. 7, there is a head member 148 attached to the shaft member 101 at the rear end, on which the injection nozzles 146 which are connected with the fluid path 105 of the shaft member 101 by fluid paths 105b are mounted and a sprocket 147 is provided. In FIG. 7, there are also an O-ring 149 at a boundary between the shaft member 101 and the head member 148, and a flat bearing 150 between the receiving member 102 and the head member 148.

This rotational high pressure fluid injector can easily be turned into an ordinary type swivel joint for high pressure fluid by replacing the injection nozzles 146, fluid paths 105b, and sprocket 149 by a straight fluid path 105c indicated in FIG. 7 by double dotted chain lines.

FIG. 8 shows still another example of a rotational high pressure fluid injector utilizing the second embodiment of the swivel joint for high pressure fluid.

In this rotational high pressure fluid injector of FIG. 8, the receiving member 102 is fixed and the shaft member 101 is to rotate with respect to the receiving member 102, as in the previous example of FIG. 7. However, in this rotational high pressure fluid injector of FIG. 8, the head member 148 is continuously formed with the shaft member 101, which completely pierce through the receiving member 102. In conjunction with this feature, the fluid path 108 of the receiving member 102 is provided on a side of the receiving member 102 and the fluid path 105 of the shaft member 101 has crossed openings at its front end, which are connected with each other through the ring shaped connecting portion 124, and two of the pressure balancing mechanism comprising the cylindrical cavity 112 and the movable sealing member 125 are provided on both sides of the connecting portion 124 symmetrically. Furthermore, the sprocket 147 is connected at the front end of the shaft member 101 by means of nuts 151, and there is a flat bearing 152 between the sprocket 147 and the receiving member 102.

This rotational high pressure fluid injector also can easily be turned into an ordinary type swivel joint for high pressure fluid in a manner similar to that described above for the previous example of FIG. 7.

It is to be noted that many other applications of the swivel joint for high pressure fluid of FIG. 5 other than those for the rotational high pressure fluid injector just described are also possible.

Thus, according to the present invention it is possible to provide a swivel joint for high pressure fluid capable of preventing the leakage of the high pressure fluid and smoothing the rotation of the rotating body, with a simple and compact structure, which can be manufactured inexpensively.

It is to be noted that many modifications and variations of the above embodiments may be made without departing from the novel and advantageous features of the present invention. Accordingly, all such modifications and variations are intended to be included within the scope of the appended claims.

What is claimed is:

1. A swivel joint for high pressure fluid systems comprising a body having a bore in which a hollow shaft is journalled, said shaft defining a pathway for fluid under pressure and extending outwardly of said body at least at one end thereof, an inlet at one end of said pathway and an outlet at the other end of said pathway for the flow of fluid under pressure, a portion of the bore of said body being of increased diameter so as to form a cylindrical cavity about said shaft said swivel joint further including a plurality of concentrically nested seals in mutual sealing engagement and in sealing engagement with said shaft and cylindrical cavity, wherein at least one of said concentrically nested seals is slideable relative the said shaft, said annular seals dividing said cavity to define on one side of said seals an enclosed chamber for lubricating material and on the other side of said seals a closed connecting portion directly communicating with said fluid pathway so that fluid under pressure from said fluid pathway exposes said other side of said seals to the pressure of the fluid within said pathway via said connecting portion so that said seals contain said fluid under high pressure within said connecting portion and at least one of said seals is urged against the lubricant in said chamber, increasing the pressure of said lubricant in said chamber and forcing said lubricant material into the gaps between said seals, said body and said seals and between said shaft and said seals.

2. The swivel joint as recited in claim 1, wherein said body has means for introducing lubricating material into said chamber.

3. The swivel joint as recited in claim 1, having bearing means between said body and said shaft so as to reduce friction due to thrust loading between said shaft and said body.

4. The swivel joint as recited in claim 1, wherein said first fluid pathway communicates with said second fluid pathway at a location between a pair of said seals.

5. The swivel joint as recited in claim 1, wherein said bore has an annular draining groove displaced from said cylindrical cavity on the second side of said seal, and said body has an exhausting draining path communicating with said draining groove.

* * * * *